US 6,535,354 B1

(12) United States Patent
Mitoh

(10) Patent No.: US 6,535,354 B1
(45) Date of Patent: Mar. 18, 2003

(54) HEAD SLIDER HAVING PADS THAT DO NOT DIRECT DUST ACROSS THE FLOAT PATTERNS

(75) Inventor: Kojiro Mitoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 44 days.

(21) Appl. No.: 09/659,192

(22) Filed: Sep. 11, 2000

(30) Foreign Application Priority Data

Dec. 17, 1999 (JP) .......................................... 11-359416

(51) Int. Cl.⁷ ............................. G11B 5/60; G11B 21/21
(52) U.S. Cl. .................................. 360/235.4; 360/236.6
(58) Field of Search ......................... 360/235.4, 235.5, 360/235.8, 236.3, 236.6, 237, 236.5

(56) References Cited

U.S. PATENT DOCUMENTS

| 5,267,109 | A | * | 11/1993 | Chapin et al. ............ 360/236.5 |
| 5,708,540 | A | * | 1/1998 | Ananth et al. ............ 360/235.4 |
| 6,144,528 | A | * | 11/2000 | Anaya-Dufresnse et al. ............ 360/235.4 |
| 6,188,547 | B1 | * | 2/2001 | Gui et al. ................. 360/236.5 |
| 6,191,923 | B1 | * | 2/2001 | Tokuyama et al. ........ 360/236.6 |
| 6,195,235 | B1 | * | 2/2001 | Boutaghou et al. ....... 360/235.2 |
| 6,233,118 | B1 | * | 5/2001 | Boutaghou et al. ....... 360/235.4 |
| 6,236,543 | B1 | * | 5/2001 | Han et al. ................. 360/236.6 |
| 6,243,233 | B1 | * | 6/2001 | Yamamoto et al. ....... 360/236.6 |
| 6,252,742 | B1 | * | 6/2001 | Kameyama ................ 360/237 |
| 6,304,418 | B1 | * | 10/2001 | Boutaghou et al. ....... 360/236.6 |
| 6,351,345 | B1 | * | 2/2002 | Kameyama ............... 360/236.3 |
| 6,373,661 | B1 | * | 4/2002 | Tokuyama et al. ........ 360/236.6 |
| 6,396,661 | B1 | * | 5/2002 | Yokohata et al. ........... 360/135 |

FOREIGN PATENT DOCUMENTS

| JP | 8-69674 | | 3/1996 |
| JP | 10-3628 | * | 1/1998 |
| JP | 10-144026 | * | 5/1998 |
| JP | 11-16315 | | 1/1999 |
| JP | 11-25630 | | 1/1999 |
| JP | 11-176120 | * | 7/1999 |
| JP | 2000-222714 | * | 8/2000 |

* cited by examiner

Primary Examiner—Jefferson Evans
(74) Attorney, Agent, or Firm—Greer, Burns & Crain, Ltd.

(57) ABSTRACT

A head slider is assembled in a magnetic disk drive unit and is capable of floating from a surface of a rotating magnetic disk by an air stream, which is formed between the rotating magnetic disk rotating and a disk-side face of the head slider. The head slider has a float pattern formed on the disk-side face that forms the air stream on the surface of the rotating magnetic disk; and a pad formed on the disk-side face and separated from the float pattern. A top end of the pad is projected from the float pattern so as to contact the magnetic disk when rotation of the magnetic disk is stopped. The float pattern is located outside of a range of the air stream which is disturbed by the pad, which is on the downstream side of the air stream with respect to the pad.

1 Claim, 3 Drawing Sheets

HEAD SLIDER HAVING PADS THAT DO NOT DIRECT DUST ACROSS THE FLOAT PATTERNS

BACKGROUND OF THE INVENTION

The present invention relates to a head slider for a magnetic disk drive unit.

FIG. 6 shows an inner mechanism of a conventional magnetic disk drive unit. The inner mechanism is contained in an enclosure 100. A magnetic disk 102 is included as a storage medium. An arm 104 is moved by an actuator 106. A base end of a suspension 108 is fixed at a front end of the arm 104; a head slider 110 is fixed on a surface of a front end of the suspension 108, which faces the magnetic disk 102.

When data are written or read from the magnetic disk 102, the magnetic disc 102 is rotated by a spindle motor. And, the arm 104 is turned about a shaft 105 by the actuator 106 as seeking action.

The magnetic disk drive unit employs a so-called CSS (Contact Start and Stop) manner. Namely, the magnetic head contacts a surface of the magnetic disk while the magnetic disk is stopped; the magnetic head is slightly floated from the surface of the magnetic disk by an air stream, which is formed when the magnetic disk is rotated. To float the magnetic head, a float pattern for floating the magnetic head is formed on a disk-side face, which faces the surface of the magnetic disk, of the head slider and a tapered section is formed along an inflow end of the head slider, from which the air stream flows into the head slider.

In the CSS-type magnetic disk drive unit, the head slider contacts the surface of the magnetic disk when the rotation of the magnetic disk is stopped. To reduce friction between the magnetic disk and the head slider and to prevent the head slider from tightly contacting the surface of the magnetic disk, projected pads are formed on the disk-side face of the head slider. With this structure, only the pads contact the surface of the magnetic disk while the magnetic disk is stopped. This improved head slider was disclosed in the Japanese Patent Gazette No. 8-69674 (see FIG. 7).

FIG. 7 is an explanation view of the head slider, in which the magnetic disk 102 is rotated and the magnetic head 110 is floated by the air stream, which is formed by rotation of the magnetic disk. Formed there are the projected pads 14 on disk-side face 12 of head slider 10, which contact the surface of the magnetic disk 102 when rotation of the magnetic disk 102 is stopped. The tapered section 16 is formed along the inflow end of the head slider 10. Note that, a head element, which is capable of writing data on and reading data from the magnetic disk 102, is formed at a part "A" of the head slider 10.

By forming pads 14 on the disk-side face 12 of the head slider 10 or 110, only pads 14 contact the surface of the magnetic disk 102, so that contact area between the head slider 10 and the magnetic disk 102 can be reduced and the magnetic head 110 can be easily floated from the surface of the magnetic disk 102.

However, pads 14 slide on the surface of the magnetic disk 102 when the rotation of the magnetic disk 102 is started. With this action, dust particles stuck on pads 14 are scattered by the air stream and stick on the disk-side face 12 of the head slider 10.

These days, high-density magnetic disks are assembled in magnetic disk drive units. Thus, small-sized magnetic heads are required, so that floating clearance between the magnetic head and the surface of the magnetic disk must be narrower. For the narrow clearance, this design is a countermeasure for dust, which is formed by sliding the head slider on the magnetic disk. Since the floating clearance between the head slider and the surface of the magnetic disk must be precisely adjusted, the floating clearance is apt to deviate from a predetermined allowable range due to dust on the disk-side face of the head slider.

SUMMARY OF THE INVENTION

An object of the present invention is to provide a head slider, which is capable of solving the disadvantages of the conventional head sliders and capable of producing a precise and reliable magnetic disk drive unit.

The head slider of the present invention is assembled in a magnetic disk drive unit and is capable of floating from a surface of a magnetic disk by an air stream, which is formed between the rotating magnetic disk and a disk-side face of the head slider and whose direction is varied according to positions on the magnetic disk. The head slider has:

a float pattern formed on the disk-side face, the float pattern forming the air stream on the surface the rotating magnetic disk; and a pad formed on the disk-side face and separated from the float pattern, a top end of the pad being projected from the float pattern so as to contact the surface of the magnetic disk when rotation of the magnetic disk is stopped, wherein the float pattern is located outside of a range of a flowing air stream disturbed by the pad, which is on the downstream side of the disturbed air stream with respect to the pad.

In the head slider, the float pattern may be formed along an inflow end of the disk-side face, from which the air stream flows onto the disk-side face, and another float pattern may be formed at a center part of an outflow end of the disk-side face, from which the air stream flows out from the disk-side face, like an island.

By employing the head slider of the present invention, sticking particles, which are formed and stuck on the pad when the head slider slides on the surface of the magnetic disk on the float pattern, which is formed on the disk-side face of the head slider, can be prevented. In This manner, the floating clearance of the magnetic head can be highly adjusted, producing a highly precise and reliable slider.

BRIEF DESCRIPTION OF THE DRAWINGS

An embodiment of the present invention will now be described by way of an example and with reference to the accompanying drawings, in which.

DETAILED DESCRIPTION OF THE PREFERRED EMBODIMENT

A preferred embodiment of the present invention will now be described in detail with reference to the accompanying drawings.

Figure 1:
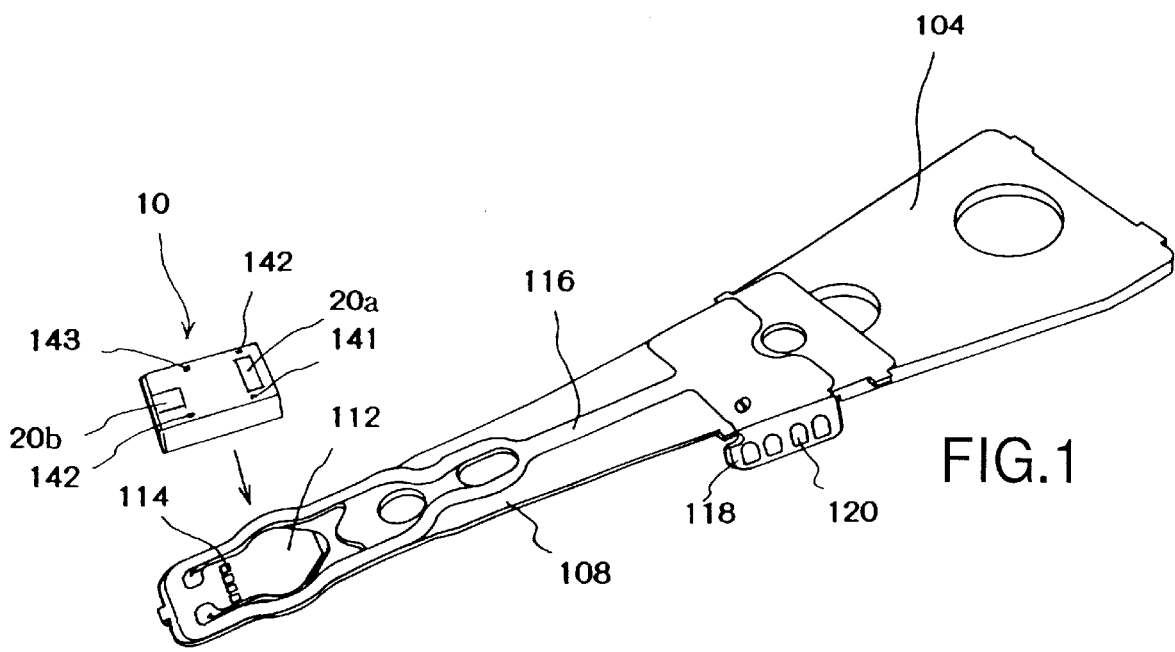
FIG. 1 is a perspective view of a magnetic head assembly, in which the head slider of an embodiment of the present invention is assembled.

The head slider of the present embodiment and a magnetic head assembly including the head slider are shown in the perspective view of FIG. 1.

Figure 6:
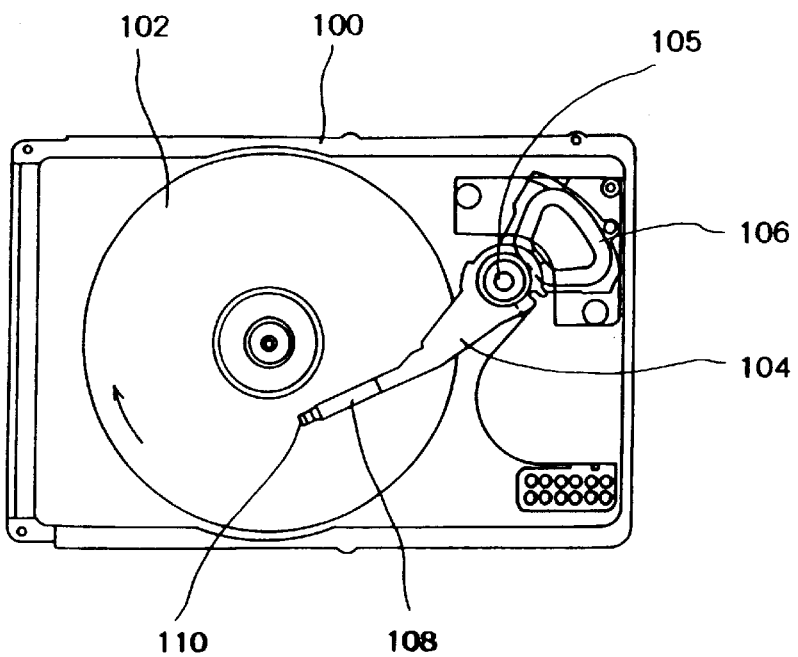
FIG. 6 is a plan view showing the inner mechanism of the conventional magnetic disk drive unit.

The magnetic head assembly includes an arm 104, a suspension 108 and the head slider 10. The structure of the head assembly is almost the same as that of the conventional head assembly other than the head slider 10. Namely, a base end of the arm 104 will be fixed to the shaft 105 of the magnetic disk drive unit, so that the arm 104 can be turned or swung, by the actuator 106, in a plane parallel to the surface of the magnetic disk 102 (see FIG. 6).

The suspension 108 is made of a metal plate, which has enough elasticity. A base end of the suspension 108 is fixed to the arm 104, so that the other end (a front end) of the suspension 108 is a free end. A gimbal section 112 is formed at a front end of the suspension 108. A slit is formed to enclose the gimbal section 112, so that only one side of the gimbal section 112 is connected to the suspension 108 and the gimbal section 112 is formed into a tongue piece. The head slider 10 is adhered and fixed on the gimbal section 112. Terminals 114 electrically connect terminals of the head slider 10, which are fixed on the gimbal section 112, to cable patterns 16, which are formed on a surface of the suspension 108.

The cable patterns 116 have prescribed shapes, and they are formed on a surface of a base plate of the suspension 108 with electrically insulating layers. A terminal section 118 is sidewardly extended from the base end of the suspension 108 and bent to form into an L-shape. The cable patterns 116 electrically connect terminals 120 in the terminal section 118 to the terminals 114. The terminals 120 will be electrically connected to control circuits of the magnetic disk drive unit so as to write data on and read data from the magnetic disk 102.

Figure 2:
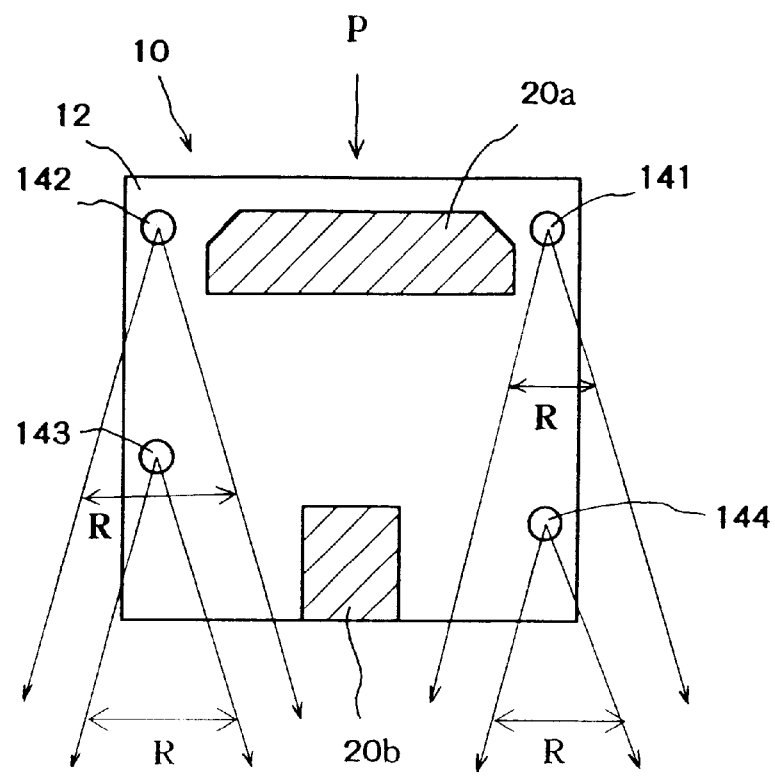
FIG. 2 is an explanation view of a disk-side face of the head slider of the embodiment.

FIG. 2 is the plan view of the head slider 10 and shows a disk-side face 12. When the head slider 10 is assembled in the magnetic disk drive unit, the disk-side face 12 faces the surface of the magnetic disk 102. There are a couple of float patterns 20a and 20b which are formed on the disk-side face 12. Furthermore, four pads 141, 142, 143 and 144 are also formed on the disk-side face 12, and they are separated away from the float patterns 20a and 20b.

Figure 3:
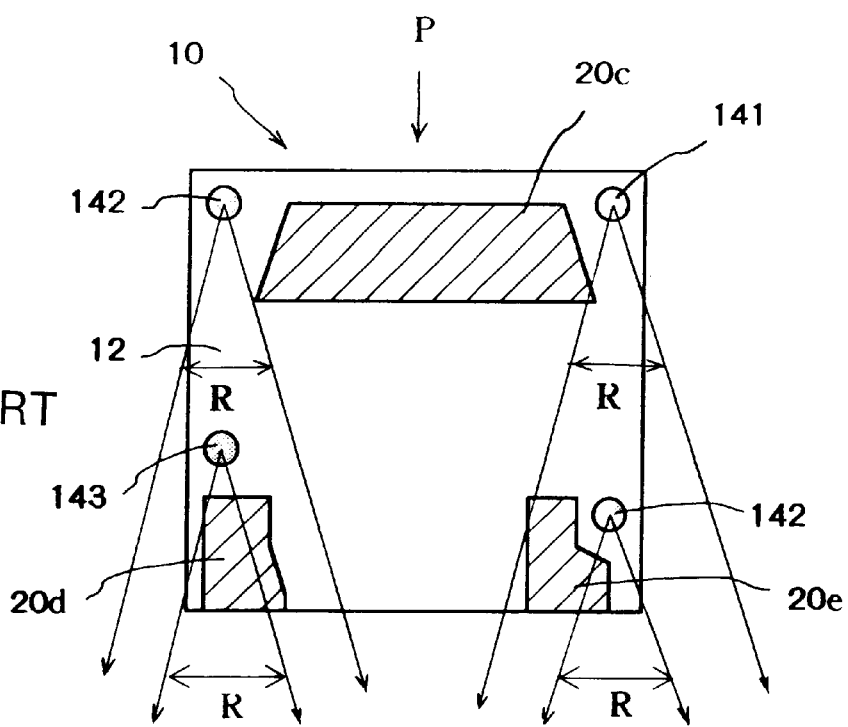
FIG. 3 is an explanation view of a disk-side face of a conventional head slider.

A plan view of the conventional head slider is shown in FIG. 3 as a comparative example. In FIG. 3, three float patterns 20c, 20d, 20e and four pads 141, 142, 143 and 144 are formed in the disk-side face 12 of the head slider 10. Note that, an air stream flows in a direction of an arrow "P" when the magnetic disk is rotated.

The pads 141, 142, 143 and 144 of the present embodiment (FIG. 2) are arranged as well as those of the conventional example (FIG. 3). However, an arrangement of the float patterns 20a and 20b of the present embodiment is quite different from that of the conventional example. Namely, in the present embodiment, the float pattern 20a is formed along an inflow end of the disk-side face 12, from which the air stream flows onto the disk-side face 12; the other float pattern 20b is formed at a center part of an outflow end of the disk-side face 12, from which the air stream flows out from the disk-side face 12, like an island. The magnetic head element, which writes data on and reads data from the magnetic disk, is provided to the position corresponding to float pattern 20b.

On the other hand, in the conventional slider 10 (see FIG. 3), the float pattern 20c is formed along the inflow end of the disk-side face 12; the float patterns 20d and 20e are respectively formed at both edge parts of the outflow end of the disk-side face 12. No float pattern is formed at the center part of the outflow end of the disk-side face 12. Note that, the magnetic head element is provided to the position corresponding to the float pattern 20d.

Figure 4:
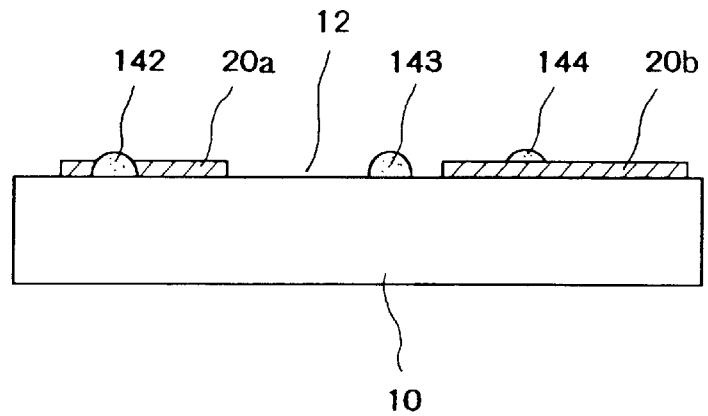
FIG. 4 is a side view of the head slider of the embodiment.

FIG. 4 is the side view of the head slider 10 of the present embodiment. The float patterns 20a and 20b are formed in the disk-side face 12, and they are formed on a surface of a base plate of the head slider 10. Thickness of the float patterns are about 100 nm. Tops of the pads 141, 142, 143 and 144 are projected about 40 nm further than surfaces of the float patterns 20a and 20b. Since the tops of the pads 141, 142, 143 and 144 are projected from the surfaces of the float patterns 20a and 20b, only the pads 141, 142, 143 and 144 contact the surface of the magnetic disk while the rotation of the magnetic disk is stopped. When the rotation of the magnetic disk is started, the pads 141, 142, 143 and 144 slide at a prescribed location on the surface of the magnetic disk, then the head slider 10 is lifted by the air stream from the surface of the magnetic disk. On the other hand, when the rotation of the magnetic disk is stopped, the head slider 10 gradually moves close to the surface of the magnetic disk with reduction of rotational speed of the magnetic disk, then the pads 141, 142, 143 and 144 slide on the surface of the magnetic disk until the rotation of the magnetic disk is perfectly stopped.

The suspension 108 slightly biases the head slider 10 toward the magnetic disk. Therefore, the head slider 10 is pressed onto the surface of the magnetic disk while the rotation of the magnetic disk is stopped.

The float patterns 20a and 20b, which are formed in the disk-side face 12 of the head slider 10, are designed to float the head slider 10 until reaching a prescribed level (height) by the air stream, which is formed when the magnetic disk is rotated.

As described above, the arrangement of the float patterns 20a and 20b of the present embodiment (see FIG. 2) is quite different from the float patterns 20c, 20d and 20e of the conventional example (see FIG. 3). The reason of the arrangement will be explained. When the rotation of the magnetic disk is started and stopped, the pads 141, 142, 143 and 144 slide on the surface of the magnetic disk, so that dust particles, which have been formed by sliding the pads and stuck on the pads, are scattered by the air stream, which is formed by the rotation of the magnetic disk, and stuck onto parts of the disk-side face 12, which are located on the downstream side. By arranging the float patterns 20a and 20b as shown in FIG. 2, the float patterns 20a and 20b can be protected from the dust.

Figure 5:
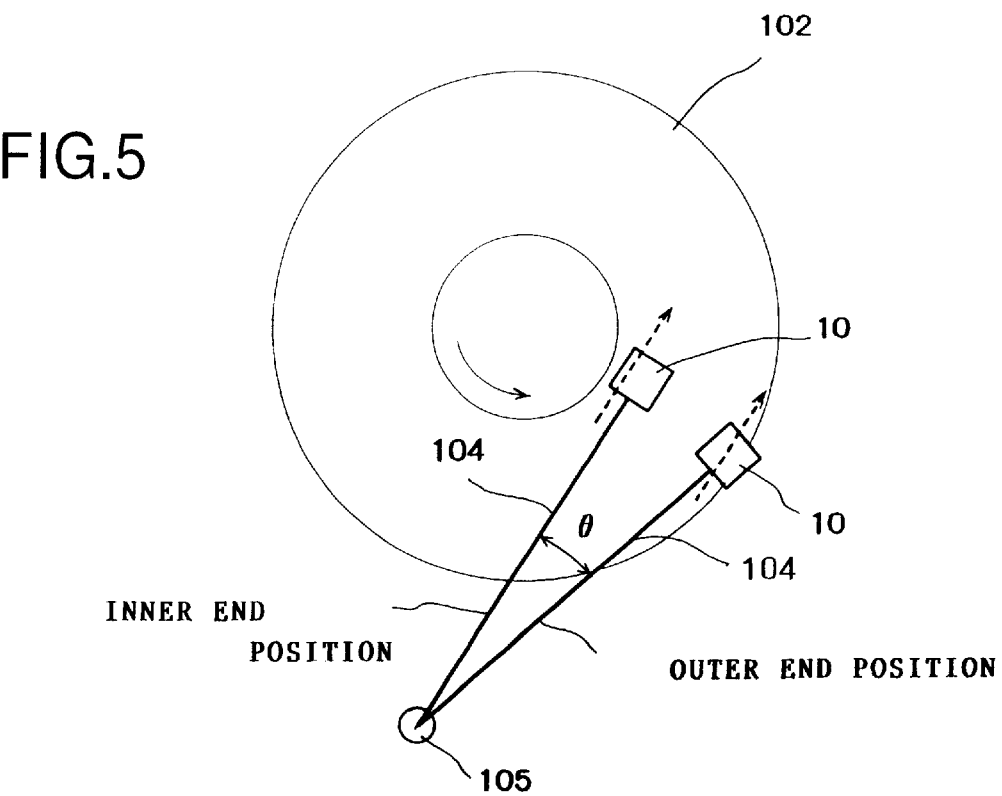
FIG. 5 is an explanation view showing an inner end position and an outer end position of the head slider and directions of an air stream corresponding to said positions.
Figure 7:
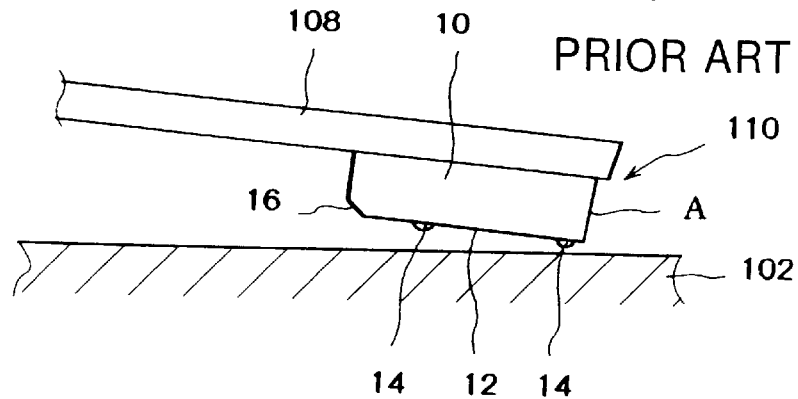
FIG. 7 is an explanation view showing the state in which the conventional head slider is floating from the surface of the magnetic disk.

FIG. 5 shows action of the head slider 10 and the magnetic disk 102. The arm 104 and the suspension 108, which hold the head slider 10, are turned or swung, about the shaft 105, between an outer end position and an inner end position. A swinging angle θ is about 20°. The direction of the air stream, which is formed when the magnetic disk 102 is rotated, is the tangential direction of the magnetic disk 102 rotating. While the head slider 10 is moved between the outer end position and the inner end position, the head slider 10 cannot move parallel to the direction of the air stream, therefore the direction the air stream must be relatively varied with respect to the head slider 10.

In FIGS. 2 and 3, the dust particles are scattered from the pads 141, 142, 143 and 144 within ranges "R", in each of which the direction of the air stream is varied while the arm 104 and the head slider 10 are moved between the outer end position and the inner end position. Namely, the direction of the air stream from each pad varies within the range "R".

As described above, the surface of the magnetic disk is ground when the rotation of the magnetic disk 102 is started and stopped, and the dusts formed by grinding the magnetic disk 102 stick onto the pads 141, 142, 143 and 144. Since the direction of the air stream is varied within the ranges "R" (see FIGS. 2 and 3), the dusts are also scattered within the range "R".

In the present embodiment, the arrangement of the float patterns 20*a* and 20*b* are designed considering the scattering ranges "R", in which the dusts formed by the pads 141, 142, 143 and 144 are scattered in the air stream. The float patterns 20*a* and 20*b* are not overlapped with the ranges "R". Namely, the float patterns 20*a* and 20*b* are located outside of the ranges "R", which are on the downstream side of the air stream with respect to the pads 141, 142, 143 and 144 (see FIG. 2). On the other hand, in the conventional head slider 10 shown in FIG. 3, the float patterns 20*d* and 20*e* are within the ranges "R", so dusts are apt to stick onto the float patterns 20*d* and 20*e*.

Actually, the particles, which are formed by sliding the pads 141, 142, 143 and 144 on the magnetic disk, will be scattered beyond the ranges "R" shown in FIG. 2. However, by locating the float patterns 20*a* and 20*b* outside of the ranges "R", sticking of the dust onto the float patterns 20*a* and 20*b* can be effectively prevented. If the dust sticks on the float patterns, a desired floating level cannot be gained. In the present embodiment, sticking of the dust particles onto the float patterns 20*a* and 20*b* can be effectively prevented, so the desired floating level of the head slider 10 can be always maintained. This is the advantageous point of the present embodiment.

The characteristic point of the present invention is the arrangement of the pads and the float patterns. Namely, the float patterns are located outside of the ranges, in which the dust particles, which are formed by sliding the pads on the surface of the magnetic disk, are scattered, so that the dust particles are prevented from sticking onto the float patterns in the disk-side face of the head slider. Therefore, as far as the float patterns are located outside of said ranges, the arrangement of the pads and the float patterns may be optionally designed. In the above described embodiment, four pads are provided in the disk-side face, but the number of the pads is not limited to four. In FIG. 2, two float patterns 20*a* and 20*b* are formed in the disk-side face 12, and the number and shapes of the float patterns are not limited. The float pattern may be optionally designed on the basis of size and elasticity of the suspension 108, etc. It is effective for designing the arrangement of the pad and the float pattern to consider the range of scattering the dusts.

The invention may be embodied in other specific forms without departing from the unique feature or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A head slider being assembled in a magnetic disk drive unit and capable of floating from a surface of a magnetic disk by an air stream, which is formed between the rotating magnetic disk and a disk-side face of said head slider and whose direction is varied according to a position of the head slider on the magnetic disk, said head slider comprising:

at least one float pattern being formed on said disk-side face, said float pattern forming the air stream on the surface of the rotating magnetic disk; and at least one pad being formed on said disk-side face and separated from said float pattern, a top end of said pad being projected from said disk-side face further than said float pattern so as to contact the surface of the magnetic disk when rotation of the magnetic disk is stopped, said pad disturbing the air stream when the magnetic disk rotates, wherein a front float pattern is formed along the end of said disk-side face from which the air stream enters onto said disk-side face, and another float pattern is formed at a center part of the end of said disk-side face from which the air stream exits from said disk-side face, like an island.

* * * * *